United States Patent
Fischer et al.

(10) Patent No.: US 6,543,607 B2
(45) Date of Patent: Apr. 8, 2003

(54) ROLLER BED FOR A CONVEYOR BELT SYSTEM

(75) Inventors: John S. Fischer, Boulder, CO (US); Edgar Hugh Schwartz, Kersey, CO (US)

(73) Assignee: Air Control Science, Inc., Boulder, CO (US)

( * ) Notice: Subject to any disclaimer, the term of this patent is extended or adjusted under 35 U.S.C. 154(b) by 0 days.

(21) Appl. No.: 09/996,109

(22) Filed: Nov. 28, 2001

(65) Prior Publication Data

US 2002/0063041 A1 May 30, 2002

Related U.S. Application Data

(63) Continuation of application No. 09/725,551, filed on Nov. 29, 2000.

(51) Int. Cl.[7] .............................................. B65G 15/08
(52) U.S. Cl. ...................... 198/826; 198/823; 198/824; 198/825
(58) Field of Search ................................ 198/826, 825, 198/824, 823, 820

(56) References Cited

U.S. PATENT DOCUMENTS

| | | | | |
|---|---|---|---|---|
| 809,227 A | * | 1/1906 | Steckel | 198/826 |
| 1,208,883 A | * | 12/1916 | Zieber | 198/826 |
| 1,530,499 A | * | 3/1925 | Knode | 198/826 |
| 2,427,590 A | * | 9/1947 | Conners | 198/826 |
| 2,818,966 A | | 1/1958 | Gill | |
| 3,089,580 A | * | 5/1963 | Dilgard | 198/826 |
| 3,259,227 A | | 7/1966 | Steinmetz | |
| 3,294,218 A | * | 12/1966 | Chantland | 198/826 |
| 4,885,059 A | * | 12/1989 | Marx, Jr. | 198/826 |
| 5,988,360 A | | 11/1999 | Mott | |
| 6,155,407 A | | 12/2000 | Shelstad | |

FOREIGN PATENT DOCUMENTS

| | | |
|---|---|---|
| GB | 890160 A | 2/1962 |
| GB | 1494960 A | 12/1977 |

OTHER PUBLICATIONS

Unknown, "Attached document was found in an advertisement or Trade Journal. Source Unknown".

* cited by examiner

Primary Examiner—Douglas Hess
(74) Attorney, Agent, or Firm—Faegre & Benson LLP

(57) ABSTRACT

A bed rail assembly apparatus that is inserted between idlers in an existing conveyor system. The bed rail assembly apparatus includes a support rail oriented substantially parallel to and beneath the conveyor belt. A first bed rail assembly on a first side of the support rail and is oriented at an angle to the horizontal surface of the conveyor belt to support a first side of conveyor belt to be inclined upwards. Small diameter, closely spaced rollers, are affixed to the inclined surface of each bed rail assembly to support the inclined side of the conveyor belt and reduce friction between the rollers and the conveyor belt. A second inclined bed rail assembly on a second side of the support rail is inclined upwards to support a second inclined side of the conveyor belt. Small diameter rollers are affixed to the inclined surface of the second bed rail assembly to incline upward a second side of the conveyor belt and to reduce friction between the second inclined bed rail assembly and the conveyor belt.

29 Claims, 6 Drawing Sheets

ROLLER BED FOR A CONVEYOR BELT SYSTEM

CROSS REFERENCE TO A RELATED APPLICATION

This application is a continuation of U.S. patent application Ser. No. 09/725,551 titled "Roller Bed for a Conveyor Belt System" and filed Nov. 29, 2000. The referenced application is hereby incorporated by reference as if the referenced application were included in this application.

FIELD OF THE INVENTION

This invention relates to conveyor belt system. More particularly, this invention relates to a bed rail assembly apparatus for supporting a conveyor belt. Still more particularly, this invention relates to a bed rail assembly apparatus that is adapted to be inserted between industry standard carry idlers of the conveyor system to support a conveyor belt with reduced drag and friction. This invention further relates to a bed rail assembly apparatus having sides that are adjustable to different widths and different inclinations to accommodate conveyor systems of different configurations.

Problem

It is common to use conveyor belts to move bulk materials from one place to another. For example, power plants transport coal from storage piles out one location to hoppers at a distant processing area using a series of conveyor belts. One problem with the use of conveyor belts is spillage of material. A second problem is air pollution from dust created by the conveyor belts. The generated dust may be volatile and can be ignited by any heat or spark introduced into the environment.

Spillage of material typically occurs at a conveyor transfer point where bulk material is passed from one conveyor belt to a second conveyor belt. The transfer often involves dropping the bulk material from the first conveyor belt to the second belt. As the bulk material hits the second conveyor belt, the bulk material spreads and some falls over the sides of the second conveyor belt. Vibrations caused by nearby machinery may shake the conveyor belt and cause bulk material to spill over the belt edges.

Air pollution is caused by induced air flow in a conveyor belt system. Bulk material falling or projected from the first conveyor belt to the second conveyor belt forms a material stream. The individual particles in the stream impart a frictional drag on the surrounding air. The surrounding air begins to flow in the direction of the material stream and attains a velocity approaching the velocity of the bulk material stream. This is called an induced air flow. The bulk material is suddenly stopped at the end of its fall and is compacted by the impact onto the second conveyor belt. The velocity pressure of the induced air flow is converted to static pressure by the material impact. A region of high air pressure is created by the static pressure. Air in the high air pressure region flows to a region of lower air pressure. This air flow contains small particles of the bulk material. In an open system, this air movement of the air is evident by a dust cloud billowing from a loading point of the second conveyor belt.

It is common to use a housing to enclose the second conveyor belt to prevent the billowing dust and reduce material spillage. A rubber skirting seal hangs on the bottom edge of the housing and drags against the top surface of the inclined sides of the conveyor belt to completely enclose the area. To maintain contact with the rubber skirting seal and the inclined sides of the conveyor belt surface, a support is positioned underneath the conveyor belt. The support often includes bars or beams that run longitudinally beneath the bottom surface of the conveyor belt along each side. This support may also include large rollers spaced apart on 4 foot centers beneath the conveyor belt. The bars or beams can cause excessive drag or friction with the bottom surface of the conveyor belt. This can cause an undue load on the motor turning the conveyor belt and/or wear of the side skirting and a wear of the belt. The drag may also generate heat that can melt the belt or the beams. With the use of large rollers having 4 foot centers or greater, the belt can sag between the rollers and cause excessive clearance between the inclined sides of the conveyor belt and rubber skirt seal. This allows material spillage and impingement points where material wedges between the inclined sides of the belt and the wearliner where the belt sags between the rollers. This causes conveyor belt damage.

Solution

The above and other problems are solved and an advance in the arts is achieved by the provision of an insertable bed rail assembly apparatus having an adjustable inclined bed of inclined rollers. A first advantage of the bed rail assembly apparatus is that the bed cradles the inclined sides of the conveyor belt at an adjustable inclination to prevent spillage. A second advantage of the invention is that the bed rail assembly apparatus has a series of inclined rollers that support to the bottom of the inclined sides of the conveyor belt. These rollers reduce friction between the bed rail assembly apparatus and the conveyor belt. The rollers are positioned with reduced spacing between rollers to prevent sag that could cause a excessive clearance between the flexible rubber skirting seals and the inclined sides of the conveyor belt. A third advantage of this invention is that the angle of inclination of the sides of the roller bed rail assembly is adjustable to allow the roller plate of the invention to be used with a range of industry standard conveyor troughing angles with infinite angle adjustments being available between those standard conveyor angles. This infinite angle adjustment compensates for small variances in equipment that is common among different manufactures. The bed rail assembly apparatus is also adjustable in its width to accommodate different conveyor systems.

A bed rail assembly apparatus embodying the invention inserted between carry idlers in an existing conveyor belt system is designed in the following manner. The bed rail assembly apparatus has a center portion oriented substantially parallel to and beneath the horizontal surface of the conveyor belt. A first bed rail assembly on a left side of the belt is inclined to support the inclined surface of the left side of the conveyor belt. This causes the left side of the conveyor belt to be inclined upwards and in-line with respect to a plane of the horizontal carrying surface of the conveyor belt. The left bed rail assembly has rollers affixed to its frame with an adjustable linkage that maintains the inclined side of the conveyor belt in contact with to the rubber skirting seal. This reduces conveyor belt drag while maintaining the left side of the belt at an inclination that creates an effective seal. A right second bed rail assembly (similar to the left side bed rail assembly) function in the same manner with respect to the inclined right side of the conveyor belt.

A horizontal center portion of the bed rail assembly has horizontal idlers positioned under the belt to reduce drag on the belt and provide additional support under the horizontal carrying surface of the belt.

In order to be inserted under conveyor belts having different designs by manufacturers, the first and second bed rail assembly apparatus that includes an adjusting linkage that changes the angle of inclination of rollers to accommodate the angle of standard carry idlers in the conveyor belt system. This adjustable linkage may include a base, a support that extends upwards from the base, and a movable attachment member that adjusts the rollers on each side to a desired angle of inclination and to a desired horizontal width.

The bed rail assembly apparatus may be affixed to a mounting rail by couplings. The side rollers on the bed rail assemblies have minimal spacing between rollers. The side rollers are advantageously smaller in diameter than the standard carry idlers beneath the belt. The minimal space between side rollers and their smaller diameter reduces that amount of unsupported area underneath the inclined sides of the conveyor belt. The side rollers are of a small diameter and have sealed precision bearing to increase speed and reduce friction.

An aspect of the invention is a roller bed rail assembly apparatus supports conveyor belt in a material receiving impact zone of a conveyor system, said roller bed rail assembly apparatus is adapted to be inserted between carry idlers of said conveyor system with said carry idlers being positioned along the length of said conveyor belt to reduce conveyor belt sag, said conveyor system further includes a hood having sidewalls covering at least a portion of said conveyor belt at said material receiving impact zone, said sidewalls each have a wear liner and a seal affixed to a bottom portion of each of said sidewalls to inhibit spillage of material between the edge portions of said conveyor belt and said wear liners and said seals; said roller bed rail assembly apparatus comprising:

a support rail oriented substantially parallel to and beneath a lower surface of said conveyor belt;

a first bed rail assembly coupled to a first end portion of said support rail;

an upper inclined portion said first bed rail assembly having a plurality of rollers inclined at an angle from horizontal to support a first portion said conveyor belt at said angle;

a second bed rail assembly coupled to an opposite end portion of said support rail;

an upper portion of said second bed rail assembly having a plurality of rollers inclined at an angle inclined from horizontal to support a second portion of said conveyor belt at said angle; and apparatus for adjusting comprising adjusting means coupled to said first bed rail assembly and to said second bed rail assembly to adjust the inclination of said first and second bed rail assemblies to accommodate conveyor belts of different characteristics including different widths.

Preferably at least one idler is positioned rail beneath said conveyor belt to support a lower horizontal surface of said conveyor belt.

Preferably said adjusting means includes linkage means coupled to said first bed rail assembly and to said second bed rail assembly to enable a change of inclination of said rollers of said first and second bed rail assemblies.

Preferably said adjusting means further comprises:

bracket means connected to said support rail;

said bracket means is movable along the length of said support rail;

an outer link means extending upwards from said bracket means;

a lower end of said outer link means is rotatably connected to said bracket means;

said outer link means is rotatable about said bracket means to position said bed rail assemblies at a desired angle of inclination.

Preferably an upper portion of said outer link means has a plurality of openings through which a bolt is inserted to engage said outer link with said bed rail assemblies.

Preferably said adjusting means comprise:

a bracket means connected to said support rail and to said bed rail assembly;

said bracket means is movable along the length of said support rail to adjust the position of said first and second bed rail assembly to accommodate conveyor belts of different widths.

Preferably said adjusting means further comprises:

outer linkage having an upper and a lower portion;

an inner linkage comprising a slide bar and a movable member;

said slide bar extends diagonally upward from said support rail towards said upper portion of said outer linkage and is connected to said outer linkage;

said movable member slidably engages said slide bar and is movable along the length of said slide bar;

an upper surface of said movable member is coupled to a bottom surface of said bed rail assemblies; and locking/unlocking means for enabling said movable member to be fixably coupled to said slide bar or to be movable along the length of said slide bar to position said inclined rollers beneath the sides of different widths conveyor belts.

Preferably said adjusting means further comprises:

outer linkage having an upper and a lower portion an inner linkage comprising a slide bar and a movable member;

a slide bar extends diagonally upward from a bracket connected to said support rail towards said upper portion of said outer linkage and is connected to said outer linkage by a bolt;

said moveable member slidably engages said slide bar and is movable along the length of said slide bar;

an upper surface of said movable member is affixed to a bottom surface of said bed rail assemblies; and locking/unlocking means for enabling said movable member to be fixably coupled to said slide bar or to be movable along the length of said slide bar to center said inclined rollers beneath the sides of different conveyor belts.

Preferably said rollers urge said first and said second sides of said conveyor belt upwards to a position proximate said seals and said wear liner of said sidewalls of said hood.

Preferably said rollers are mounted on said bed rail assemblies with spacing between rollers being less than 12.5% of the diameter of the rollers.

Preferably said rollers are mounted on said bed rail assemblies with spacing between rollers being less than 6% of the diameter of the rollers.

Preferably said rollers are smaller in diameter than said idlers by a factor of less than 1 to 3.

Preferably said rollers are smaller in diameter than said idlers by a factor of less than 1 to 6.

Preferably said apparatus for adjusting comprises:

adjusting means coupled to said first bed rail assembly and to said second bed rail assembly to adjust the position of said first and second bed rail assemblies along a horizontal axis to accommodate conveyor belts of different widths.

Preferably said apparatus for adjusting comprises:

adjusting means coupled to said first bed rail assembly and to said second bed rail assembly to adjust the inclination said first and second bed rail assemblies.

Preferably said apparatus for adjusting comprises:

adjusting means coupled to said first bed rail assembly and to said second bed rail assembly to adjust the position of said first and second bed rail assemblies along an inclined axis to center said first bed rail assembly and second bed rail assembly beneath the inclined sides of conveyor belts of different dimensions including different widths.

Preferably said apparatus for adjusting comprises:

adjusting means coupled to said first bed rail assembly and to said second bed rail assembly to adjust the position of said first and second bed rail assemblies along a horizontal axis to accommodate conveyor belts of different types;

adjusting means coupled to said first bed rail assembly and to said second bed rail assembly to adjust the inclination said first and second bed rail assemblies to accommodate conveyor belts of different types; and adjusting means coupled to said first bed rail assembly and to said second bed rail assembly to adjust the position of said first and second bed rail assemblies along an inclined axis to center said first bed rail assembly and second bed rail assembly beneath the inclined sides of conveyor belts of different types.

Another aspect is a roller bed rail assembly apparatus adapted to be inserted between carry idlers of a conveyor system, said roller bed rail assembly apparatus comprising:

a support rail oriented substantially parallel to and beneath a lower surface of a conveyor belt of said conveyor system;

a first bed rail assembly coupled to a first end portion of said support rail;

an upper portion of said first bed rail assembly having a first plurality of rollers inclined at an angle offset from horizontal to said to support a first side said conveyor belt at said angle;

a second bed rail assembly coupled to an opposite end portion of said support rail;

an upper portion of said second bed rail assembly having a second plurality of rollers inclined at an angle offset from horizontal to support a second side of said conveyor belt at said angle;

apparatus for adjusting comprising adjusting means coupled to said first and said second bed rail assembly to adjust the inclination of said rollers supporting the sides of said conveyor belt;

at least one idler coupled to said support rail to support a lower horizontal surface of said conveyor belt; and said apparatus for adjusting comprises adjusting means coupled to said first bed rail assembly and to said second bed rail assembly to adjust the position of said first and second bed rail assemblies to accommodate conveyor belts of different widths.

Preferably a hood covering a material receiving impact zone portion of said conveyor belt;

vertically oriented sidewalls of said hood extending downwardly towards said sides of said conveyor belt;

the lower portion of said sidewalls are each affixed to a wear liner and a seal;

said rollers urge said sides of said conveyor belt upwards to a position proximate said wear liner and against said seals to reduce conveyor belt sag to inhibit the spillage of material from the sides of said conveyor belt under said wear liners and said seals.

Preferably said first plurality of rollers and said second plurality of rollers are mounted on said bed rail assemblies with minimal space between said rollers to reduce conveyor belt sag.

Preferably said first plurality of rollers and said second plurality of rollers are smaller in diameter than said idlers of said conveyor system to reduce conveyor belt sag.

Preferably said roller bed rail assembly apparatus is adapted to support a conveyor belt in a material receiving impact zone of said conveyor system, said roller bed rail assembly apparatus is further adapted to be inserted between said carry idlers positioned along the length of said conveyor belt to reduce conveyor belt sag, said roller bed rail assembly apparatus further includes a hood having sidewalls covering said material receiving impact zone, said sidewalls each have a wear liner and a seal affixed to a bottom portion of said sidewalls to inhibit spillage of material between the edges of said conveyor belt and said wear liners and said seals;

said roller bed rail assembly apparatus further comprising:

apparatus for adjusting comprising adjusting means coupled to said first bed rail assembly and said second bed rail assembly to adjust the inclination of said first bed rail assembly and said second bed rail assembly to support the side portions of said conveyor belt; and at least one idler coupled to said support rail beneath said conveyor belt to support a lower horizontal surface of said conveyor belt to prevent belt sag.

Preferably said roller bed rail assembly apparatus is adapted to support a conveyor belt in a material receiving impact zone of a conveyor system, said roller bed rail assembly apparatus is also adapted to be inserted between said carry idlers positioned along the length of said conveyor belt to reduce conveyor belt sag, said roller bed rail assembly apparatus further includes a hood having sidewalls covering at least a portion of said material receiving impact zone of said conveyor belt, a wear liner and a seal affixed to the bottom portion of said sidewalls to inhibit spillage of material between the edges of said conveyor belt and said wear liner and said seals; and said rollers are of a diameter sufficiently smaller than the diameter of said carry idlers and are positioned sufficiently close to each other along the length of said conveyor belt at a spacing that reduces conveyor belt sag and inhibits the spillage of material between the edges of said belt and said skirting seals and said wear liners.

Another aspect is a roller bed rail assembly apparatus for supporting a conveyor belt in a material receiving impact zone of a conveyor system, said roller bed rail assembly apparatus is adapted to be inserted between carry idlers of said conveyor system along the length of said conveyor belt to reduce conveyor belt sag, said conveyor system further includes a hood having sidewalls covering at least a portion of a material receiving impact zone of said conveyor belt, a wear liner and a seal affixed to the bottom portion of said sidewalls to inhibit spillage of material between the edges of said conveyor belt and said wear liner and said seals;

said roller bed rail assembly apparatus comprising:

a support rail oriented substantially parallel to and beneath said conveyor belt;

a first bed rail assembly coupled to a first end portion of said support rail;

an upper portion of said first bed rail assembly having a plurality of rollers inclined at an angle from horizontal to said to support a first side said conveyor belt at said angle;

a second bed rail assembly coupled to an opposite end portion of said support rail;

an upper portion of said second bed rail assembly having a plurality of rollers inclined at an angle from horizontal to support a second side of said conveyor belt at said angle;

said rollers urge said first and said second sides of said belt upwards against said seals to reduce conveyor belt sag and to inhibit the spillage of material from the sides of said conveyor belt under said wear liners and said seals;

said rollers are of a diameter sufficiently smaller than the diameter of said carry idlers and are positioned sufficiently close to each other along the length of said belt at a spacing that reduces conveyor belt sag and inhibits the spillage of material between the upper edges of said belt and said seal and said wear liners.

Preferably said rollers are mounted on said bed rail assemblies with spacing between rollers being less than 12.5% of the diameter of the rollers.

Preferably said rollers are mounted on said bed rail assemblies with spacing between rollers being less than 6% of the diameter of the rollers.

Preferably said rollers are smaller in diameter than said idlers by a factor of less than 1 to 3.

Preferably said rollers are smaller in diameter than said idlers by a factor of less than 1 to 6.

Preferably said seals are formed of rubber.

DESCRIPTION OF THE DRAWINGS

The above and other features of this invention are described in the detailed description given below and the following drawings.

DETAILED DESCRIPTION

Figure 1:
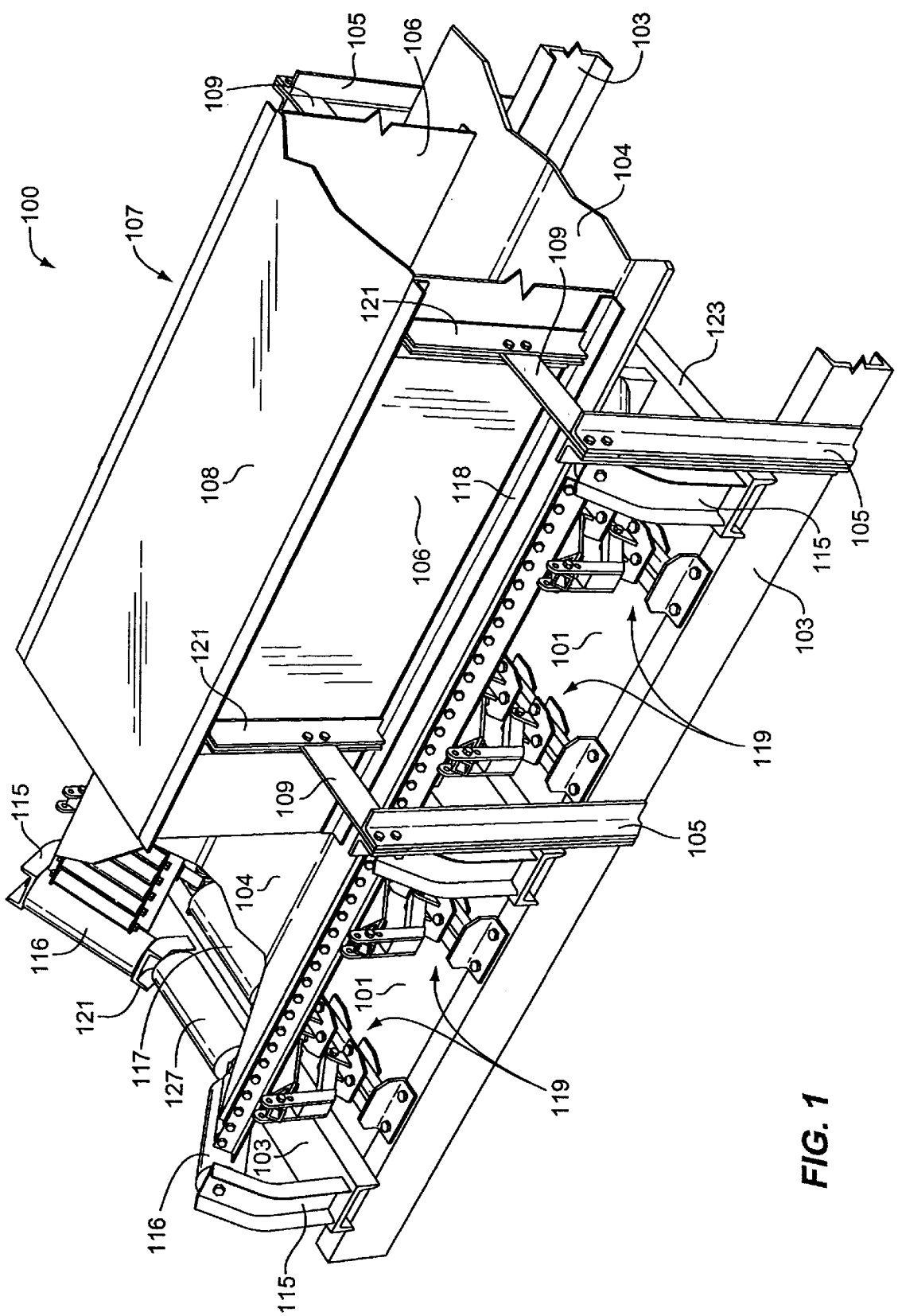
FIG. 1 illustrates a conveyor system 100 including bed rail assembly apparatus embodying the invention.
Figure 2:
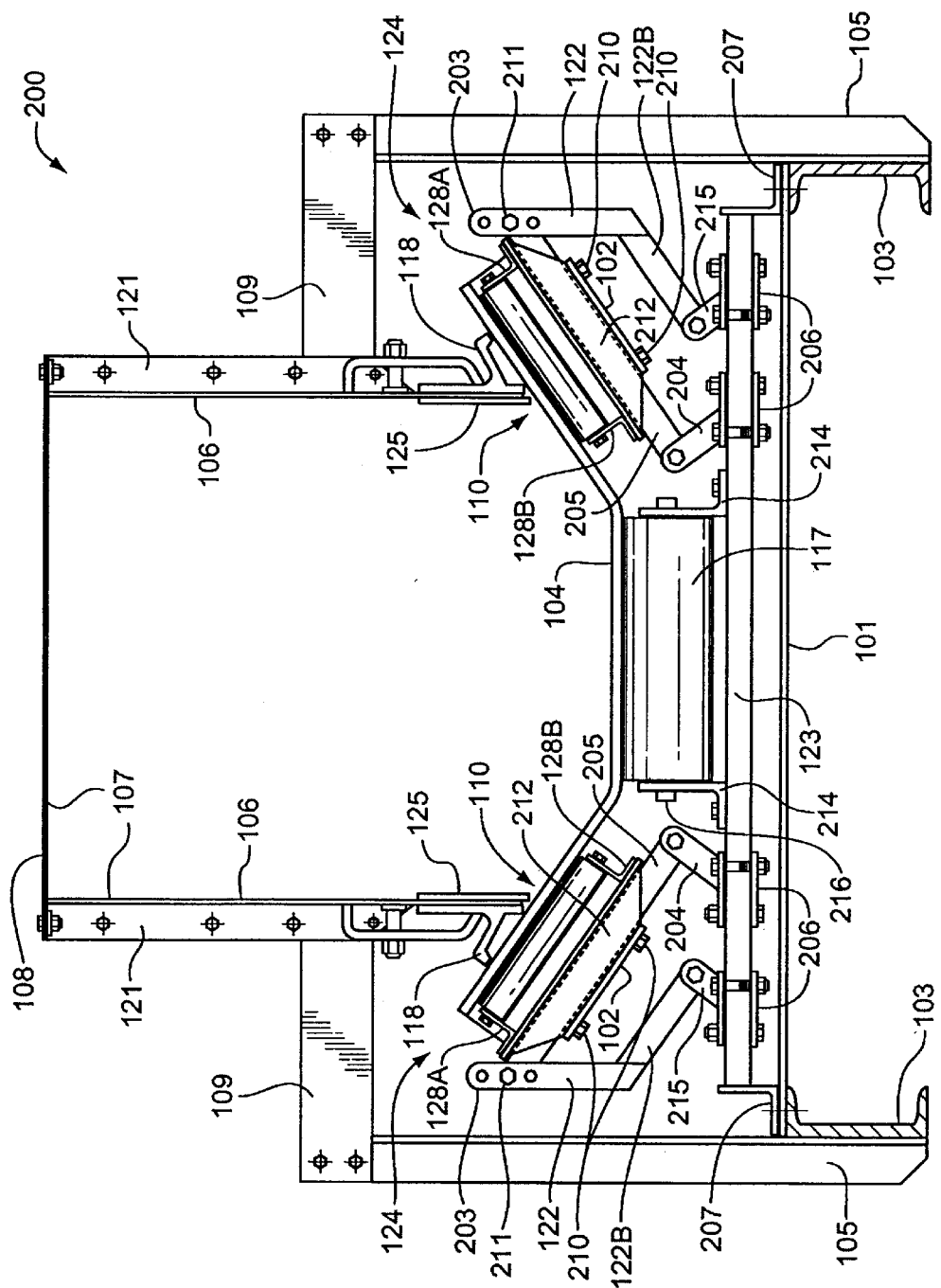
FIG. 2 illustrating a sectional front view of a bed rail assembly apparatus inserted into a conveyor belt system in accordance with this invention.
Figure 3:
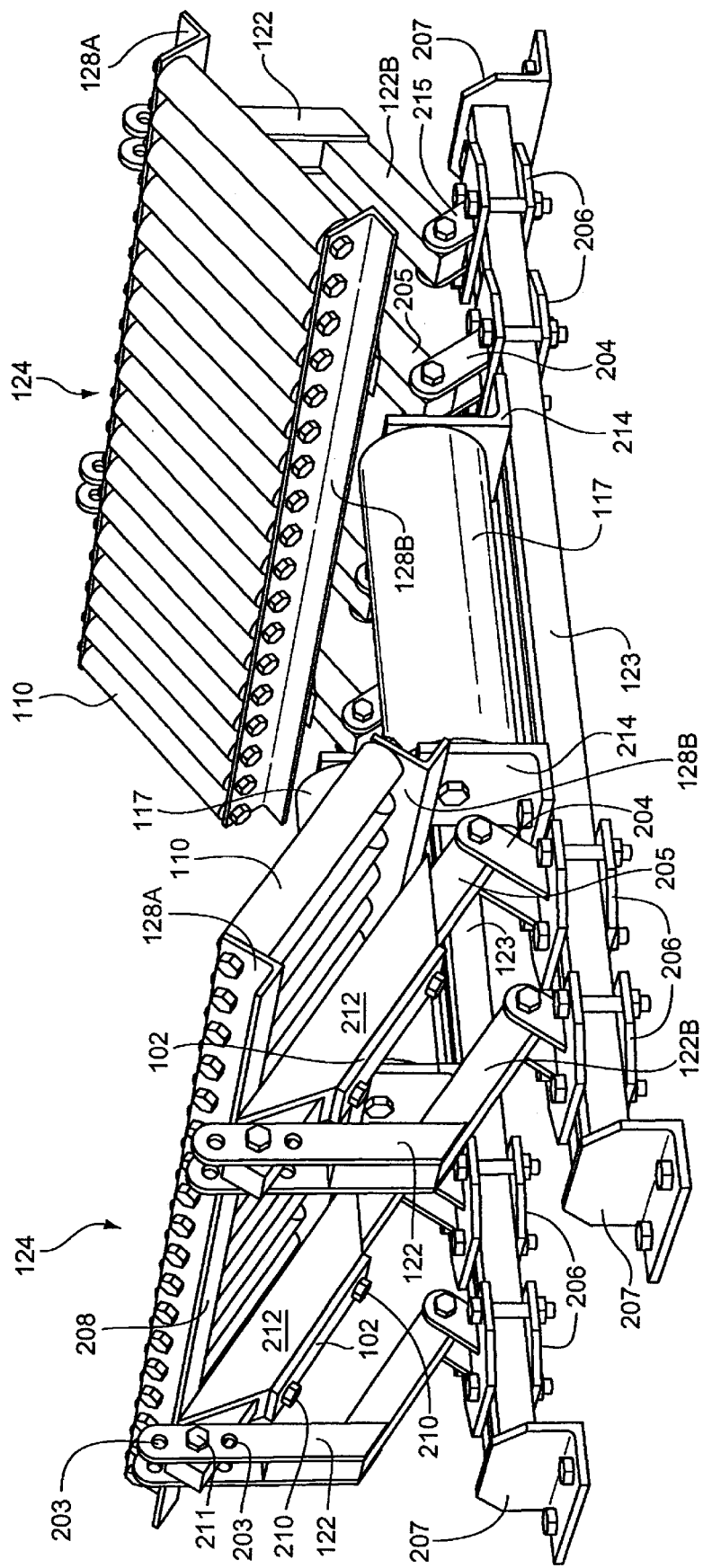
FIG. 3 is a perspective view of the roller bed rail assembly apparatus comprising the invention.

Description of FIGS. 1, 2 and 3

FIG. 1 discloses the roller bed rail assembly apparatus of the present invention embodied into an existing conveyor system 100 having a top hood 107, a hood cover 108 and vertical skirt sidewalls 106. Vertical supports 121 are connected to vertical skirt side walls 106. Vertical supports 121 are further connected to horizontal skirt wall supports 109 each of which is connected at its outer end to vertical support element 105 which at its lower end is connected to stringer 103 which comprises a lower base for conveyor system 100.

The equipment provided in accordance with the present invention includes the conveyor glider bed apparatus 119 of which four are shown on FIG. 1. Glider bed apparatus 119 includes inclined rollers 110 which are shown inclined at an angle of inclination to support the inclined sides of belt 104. This inclination contains the material transported by conveyor belt 104 while preventing material spillage over the inclined sides of conveyor belt 104. The apparatus provided in accordance with the present invention further includes a series of center idlers 117 underneath belt 104. Only one idler 117 is shown on FIG. 1. However, each glider bed 119 includes an idler 117. The system of FIG. 1 further includes inclined carry idlers 116 which comprise a part of the existing conveyor system. Carry idlers 127 and 116 are positioned approximately every four feet along the length of conveyor belt 104. Hood 107 encloses the top portion of conveyor system 1(00 and prevents spillage of material over the sides of the belt and further prevents the escape of dust generated by the movement of the material load. The escape of dust and the spillage of material is further prevented by rubber belt seals 118 positioned on the lower portion of the inner side skirt walls 106 (FIG. 2). Rubber belt seals 118 and wear liner 125 have a lower end which depress against the top of the inclined portion of belt 104. Idler support 115 supports carry idler 116 and rests on conveyor stringer 103 of FIG. 1.

FIG. 2 is a sectioned front view of conveyor system 100 including conveyor belt 104. FIG. 2 discloses a deck 101, support rail platform 123, a left side plate 102 and a right side plate 102. Left side plate 102 inclines the left side of conveyor belt 104 upwards to prevent spillage and to hold conveyor belt 104 against a rubber belt seal 118. Right side plate 102 inclines a right side of conveyor belt 104 to upwards to prevent spillage and holds conveyor belt 104 against a rubber belt seal 118.

Support rail 123 holds idlers 117 and a carrying surface of conveyor belt 104 flat. Support rail 123 supports conveyor belt 104 and idler 117 from buckling under the impact of material. Support rail 123 has a support surface oriented substantially parallel to the carrying surface of conveyor belt 104. Support rail 123 supports bed rail assembly 124 and the carrying surface of conveyor belt 104. End bed rail assembly 124 includes inclined rollers 110. Inclined rollers 110 and idlers 117 are coupled to support rail 123 via struts 215, 204 and 205. Struts 215 and 204 are affixed to support rail 123 by bolts 206 that thread through openings in support rail 123. Idlers 117 are affixed to support rail 123 by bracket 211 and pin 216.

Left side plate is on the left side of support rail 123. Left side plate 102 comprises a part of the bed rail assembly 24 which is subsequently described in connection with FIG. 3 and includes rollers 110, elements 212, 122, 204, 205 all as described in further detailed for FIG. 3. FIG. 2 has right side plate 102 identical in all respects to the left side apparatus 102. Bed rail assembly 124 supports the inclined lower surfaces of belt 104 to enclose the entrapped dust generated by the conveyor and to prevent the spillage of material over the sides of the inclined belt. Bed rail assembly 124 comprises the above enumerated apparatus and is adjustable as described in connection with FIG. 3 and later in connection with FIGS. 5, 6 and 7 to enable the bed rail assembly 124 to be usable in the different conveyor systems having different degrees of inclination for the side portions of the conveyor belt.

Member 212 is slidable on element 205 to permit the rollers 110 of FIG. 3 to be adjusted to an inclined angle corresponding to that of the inclined sides of the conveyor belt. Element 212 is adjustable to enable the entire array of rollers 110 shown on FIG. 3 to be adjustable and slidable to different positions to accommodate conveyor belts 104 of different widths and different angles of inclination. Slidable element is mounted on member 205 whose left end is pivotably connected to element 204 which comprises a part of bracket 206. The right end of element 205 is affixed by means of a bolt 211 to one of holes 203 in outside linkage 122 that is a one piece element which includes element 122B. The lower part of 122B is pivotably affixed by means of a bolt to element 215 which comprises a part of bracket 206.

The bed rail assembly 124 comprising the present invention is adjustable so as to be compatible with different conveyor systems. Both the left and right side plates 102, as best shown on FIG. 3, include member 212 which are slidably mounted on member 205. The slidable interaction between movable member 212 and element 205 permit the entire bed rail assembly 124 including rollers 110 to be adjustable in width to accommodate different belts. The bed rail assembly 124 and element 212 and rollers 110 are further adjustable regarding their angle of inclination. The angle of inclination is adjusted by releasing set screws 210 to enable elements 212 and 205 to be movable with respect to each other. The outside linkage 122 is then adjusted by rotating linkage 122 about its pivot point on element 215 and, at the same time, interconnecting the bar 205 and the vertical portion of outside linkage 122 by inserting a bolt 211 through the appropriate hole 203 in the vertical portion of outside linkage 122. Following this, the set screws 210 may be then adjusted and tightened so that movable member 212 is fixably positioned with respect to slide bar 205.

FIG. 2 is a sectioned front view of the bed rail assembly apparatus 124 shown in further detail on FIG. 3. The function of the bed rail assembly 124 is to support the lower horizontal portion of conveyor belt 104 by means of idlers 117 provided the apparatus of the invention. Another function of the bed rail assembly 124 is to support the inclined sides of the conveyor belt 104 with rollers 110. Each bed rail assembly 124 is adjustable in width by set screws 210 which can be loosened to enable member 212 to be slidable along inclined slide bar 205. The bed rail assembly 124 together with its rollers 110 may be further adjustable in width to accommodate different conveyor belts by means of loosening the bolts associated with brackets 206 to slide bed rail assembly 124 to the left or right along support rail 123 to accommodate conveyor belts of different widths. Following the adjustment, the bolts associated with brackets 206 may be tightened as may be the set screws 212. Each bed rail assembly 124 is adjustable to different angles of inclination by removing bolt 211 from a current hole 203 of outside linkage 122, by rotating the one piece linkage 122 and 122B about its pivot point on bracket 206, by rotating slide bar 205 about its pivot point connected to a portion of bracket 206 and element 215 to position rollers 110 of bed rail assembly 124 to an inclination of that matches the inclination of the conveyor belt. Following this, bolt 211 is then inserted into the appropriate hole 203 of vertical linkage 122 to accommodate the desired inclination of the bed rail assembly 124. Following this, the bolts and set screws associated with this adjustment are tightened to fix the bed rail assembly 124, the desired width along support rail 123, the desired angle of inclination, and the desired position on element 205.

Support rail 123 supports bed rail assembly apparatus as well as idlers 117 which support the horizontal carrying surface of conveyor belt 104 flat. Support rail 123 prevents conveyor belt 104 from buckling under the impact of the material load. Support rail 123 and idler 117 provide a support surface beneath the carrying surface of conveyor belt 104. Support rail 123 also supports inclined rollers 110 and its associated members.

Conveyor system 200 of FIG. 2 includes side skirt boards 107 and top covering 108. Side skirt boards 107 and covering 108 are positioned over and enclose conveyor belt 104. Supports 109 couple side skirt boards 107 via vertical members 121 to the base of conveyor belt system 200 via conveyor stringers 105.

Wear liners 125 depend from the bottom end of skirt boards 107. Wear liners 125 engage the top portions of conveyor belt 104 to prevent material from spilling out of the sides of conveyor belt 104. Skirting seals 118 extend outward from wear liners 125 and further engage conveyor belt 104.

Figure 4:
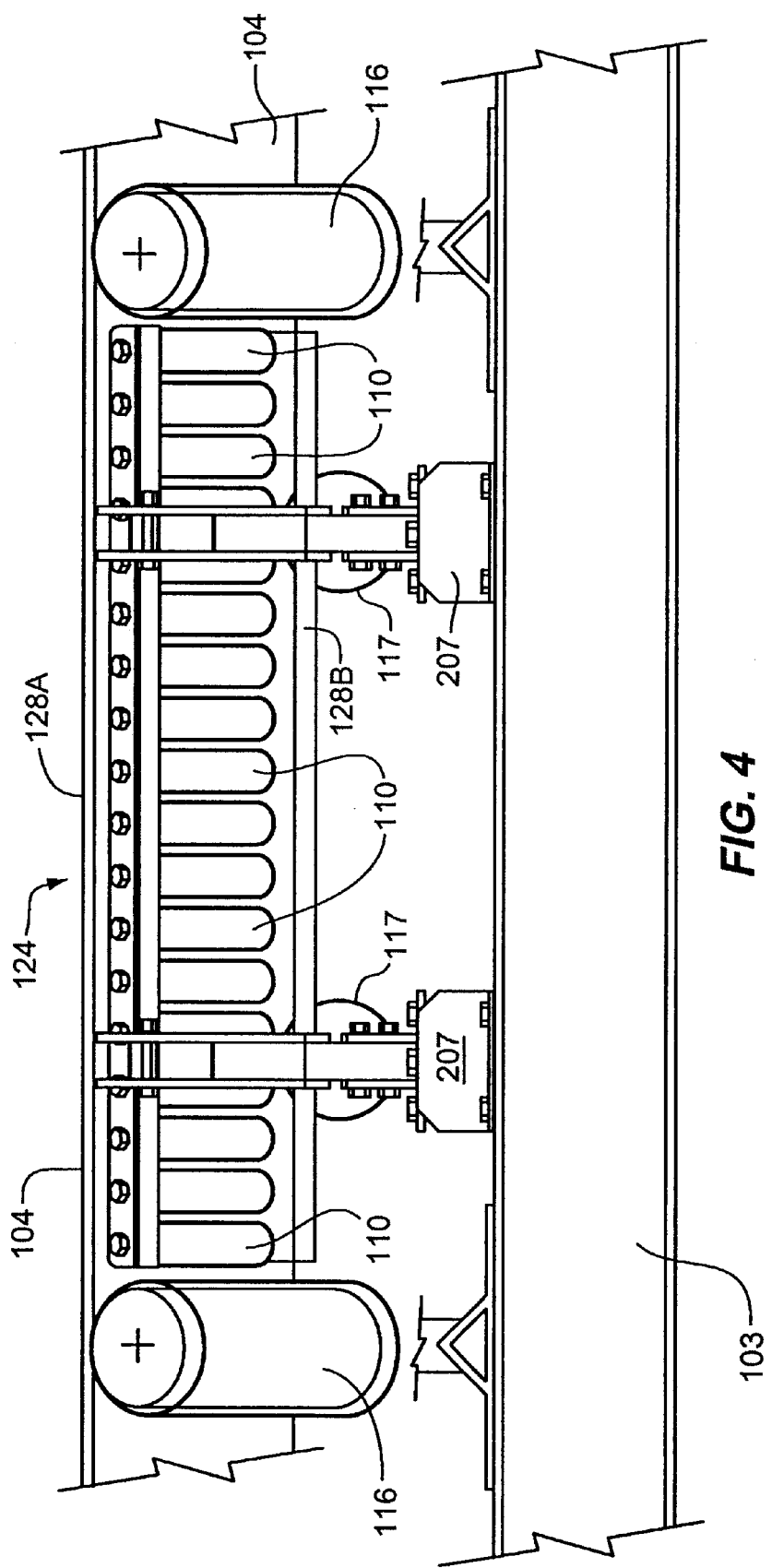
FIG. 4 is a lower side view of the bed rail assembly apparatus of the present invention.

FIG. 4 is a lower side view of the elements of the bed rail assembly 124. It shows the inclined carry idlers 116 of the existing conveyor system. It further shows the inclined rollers 110 of bed rail assembly 124. It further shows the brackets 207 which are fixed to the ends of the support rail 123 shown on FIGS. 2 and 3. It further shows the upper and lower brackets 128A and 128B mounting rollers 110 to the rest of the bed rail assembly 124. All of this apparatus is mounted to the frame 103 termed the "conveyor stringer" as shown on FIG. 1.

FIG. 4 also shows the idlers 117 which as shown on FIG. 1 are horizontally oriented beneath the lower surface of the conveyor belt to provide further support for the horizontal portion of the conveyor belt. The horizontal idler 117 comprises an integral part of each element 119 on FIG. 1 which is termed the "glider bed". Each bed rail assembly 124 includes two glider bed elements 117 and thus two horizontally oriented idlers 117 in addition to the array of inclined rollers 110.

Rollers 110 are of the smaller diameter than are the inclined idlers 116 of the existing conveyor systems. This allows rollers 110 to be closely spaced to minimize the unsupported belt span of the inclined portion of belt 104 between rollers 110 to minimize sag of the inclined portion of the belt. This provides improved material support for the inclined portion of the belt and, as best shown on FIG. 2, permits the rubber belt seal 118 and wearliner 125 to engage the inclined portion of the belt 104 to minimize the escape of dust and to minimize material spillage over the inclined sides of the conveyor belt 104. In a preferred embodiment of the invention, rollers 110 are of small diameter and have sealed precision bearings. This promotes improved sealing for the conveyor belt 104 to prevent spillage.

Figure 7:
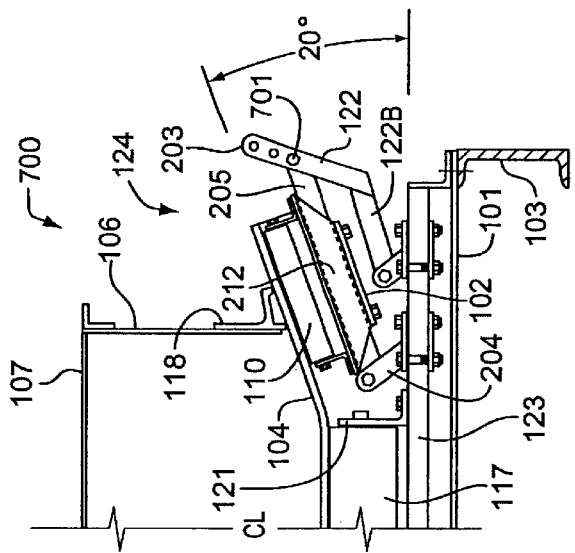
FIGS. 5, 6, and 7 illustrate further details of the apparatus that enables the inclined side plate rollers to be adjusted to different angles.
Figure 6:
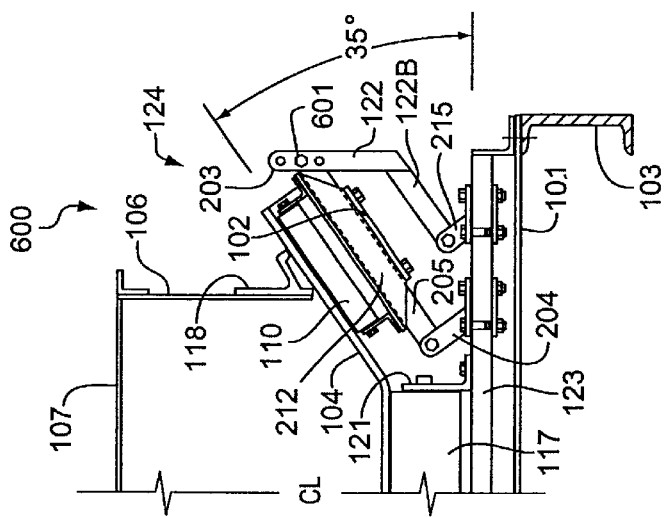
Figure 5:
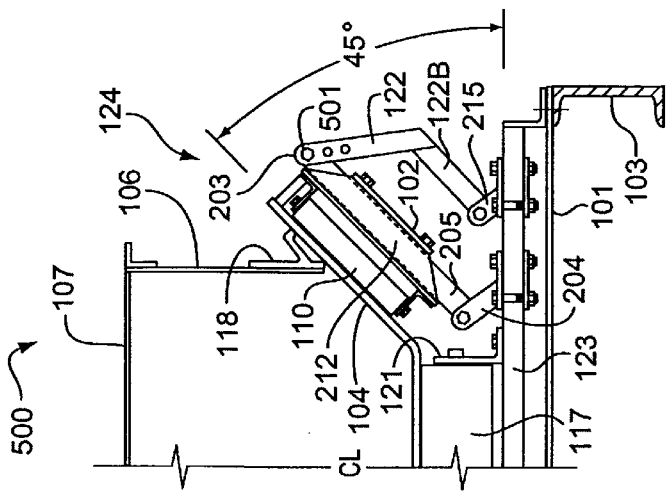

FIGS. 5, 6, and 7 illustrate first side plate 102 at a variety of angles to fit under different conveyor belts. In FIG. 5, side plate 102 position 500 at a 45 degree angle with respect to the plane of the carrying surface of the conveyor belt. In the shown embodiment, first side plate 102 is placed in position 500 by inserting a bolt through a top most opening 501 in movable attachment member 122. In FIG. 6, side plate 102 is placed in position 600 which is at a 35 degree angle with respect to the plane of the carrying surface of conveyor belt 104. In the shown embodiment, first side plate 102 is placed in position 600 by inserting a bolt through a middle opening 601 in movable attachment member 122. In FIG. 7, first side plate 102 is in position 700 at a 20 degree angle with respect to the plane of the carrying surface of conveyor belt 104. In the shown embodiment, first side plate 102 is placed in position 700 by inserting a bolt through a lower most opening in movable attachment member 122.

Figure 8:
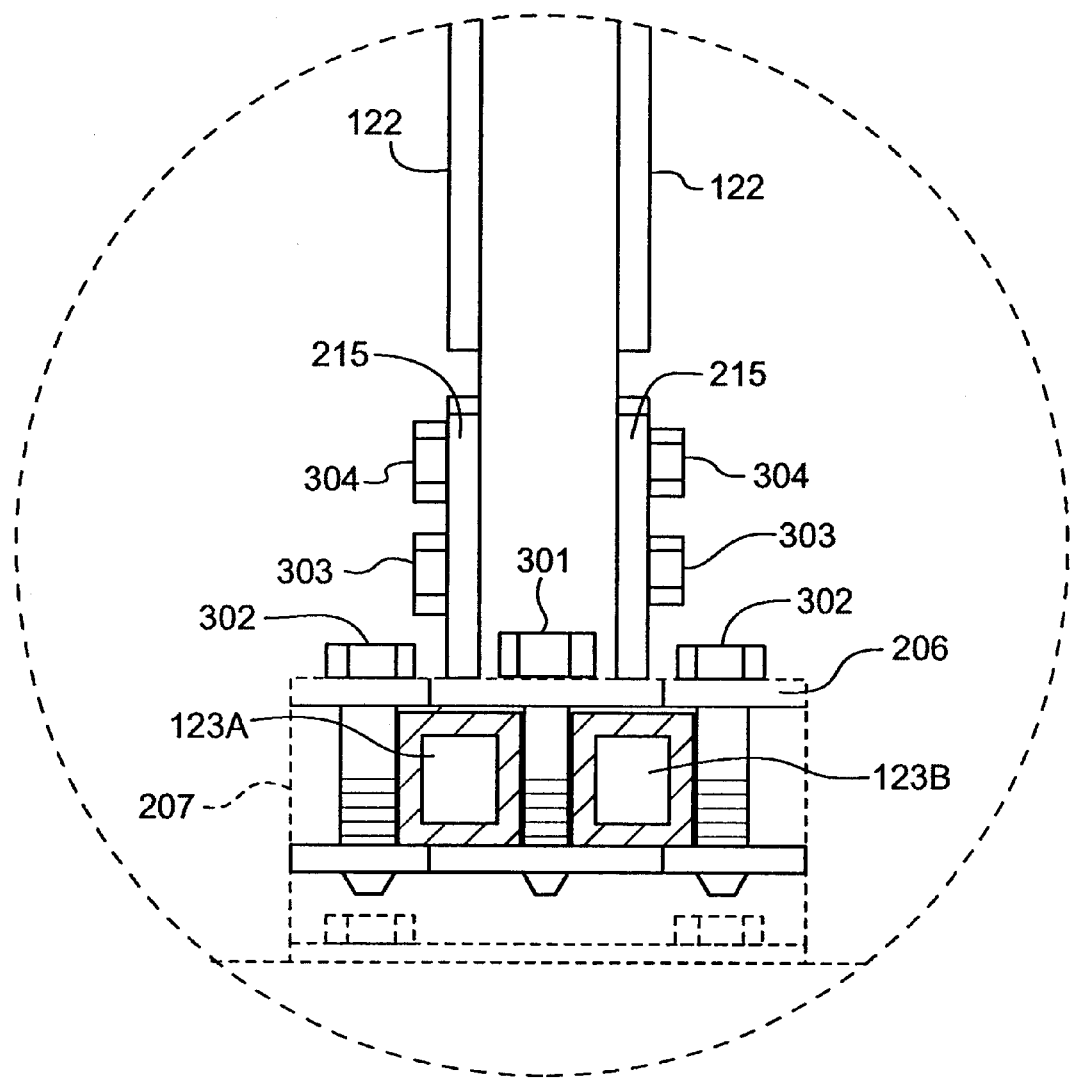
FIG. 8 illustrates further details of support rail 123 and end bracket 207.

Detailed Description of FIG. 8

FIG. 8 discloses further details of support rail 123 of FIG. 3 and how it interacts with the brackets 206 and their associated bolts. The single support rail 123 of FIG. 3 actually comprises two separate rails 123A and 123B of FIG. 8. A space exists between the rails 123A and 123B to allow bolt 301 to extend downwardly through the space to clamp upper and lower portions of bracket 206 together when the bolt 301 is tightened. The front and rear bolts 302 on the front and back of the plates 206 on FIG. 3 can be tightened or loosened to control the clamping of plates 206 rigidly to the front and rear platform rails 123A and 123B. The ends of elements 123A and 123B are welded to brackets 207 (FIG. 2).

FIG. 8 further shows side portion of member 204 affixed to upper bracket 206 and its bolts 303 and 304. Also shown is the side portion of the lower segment 122B of outside linkage 122.

The structure shown on FIG. 8 permits the bolts shown thereon to be loosened so that each bed rail assembly 124 can be slidably adjusted along the length of platform rail 123. This adjustability is desired so that the bed rail assemblies 124 can be adjusted as required to accommodate the various widths of conveyor belts 104 to which the apparatus of FIG. 3 is to be engaged when in use.

The above is a description of a roller bed rail assembly that is inserted between idlers in an existing conveyor system in accordance with this invention.

In a preferred embodiment of the invention, carry idlers 127 are positioned every 4 feet along the load carrying portion of the conveyor and every 10 feet on the return portion of the belt. The carry idlers are 6 inches in diameter and the rollers 110 are 2½ inches in diameter. The spacing between the outer surface of adjacent rollers 110 is ¼ inch. The bed rail assembly 124 is 40 inches in length.

The above dimensions are merely exemplary and may vary over a considerable range.

It is to be expressly understood that the claimed invention is not to be limited to the description of the preferred embodiment but encompasses other modifications and alterations of varying dimensions.

What is claimed:

1. Roller bed rail assembly apparatus that supports a conveyor belt in a material receiving impact zone of a conveyor system, said roller bed rail assembly apparatus is adapted to be inserted between carry idlers of said conveyor system with said carry idlers being positioned along the length of said conveyor belt to reduce conveyor belt sag, said conveyor system further includes a hood having sidewalls covering at least a portion of said conveyor belt at said material receiving impact zone, said sidewalls each have a wear liner and a seal affixed to a bottom portion of each of said sidewalls to inhibit spillage of material between the edge portions of said conveyor belt and said wear liners and said seals; said roller bed rail assembly apparatus comprising:

a support rail oriented substantially parallel to and beneath a lower surface of said conveyor belt;

a first bed rail assembly coupled to a first end portion of said support rail;

an upper inclined portion of said first bed rail assembly having a plurality of rollers inclined at an angle from horizontal to support a first portion said conveyor belt at said angle;

a second bed rail assembly coupled to an opposite end portion of said support rail;

an upper portion of said second bed rail assembly having a plurality of rollers inclined at an angle inclined from horizontal to support a second portion of said conveyor belt at said angle; and apparatus for adjusting comprising adjusting means coupled to said first bed rail assembly and to said second bed rail assembly to adjust the inclination of and the lateral spring of said first and second bed rail assemblies to accommodate conveyor belts of different characteristics including different widths.

2. The roller bed rail assembly apparatus of claim 1 in which at least one idler is positioned rail beneath said conveyor belt to support a lower horizontal surface of said conveyor belt.

3. The roller bed rail assembly apparatus of claim 1 wherein said adjusting means includes linkage means coupled to said first bed rail assembly and to said second bed rail assembly to enable a change of inclination of said rollers of said first and second bed rail assemblies.

4. The roller bed rail assembly apparatus of claim 3 characterized in that said adjusting means further comprises:

bracket means connected to said support rail;

said bracket means is movable along the length of said support rail;

an outer link means extending upwards from said bracket means;

a lower end of said outer link means is rotatably connected to said bracket means;

said outer link means is rotatable about said bracket means to position said bed rail assemblies at a desired angle of inclination.

5. The roller bed rail assembly apparatus of claim 4 characterized in that an upper portion of said outer link means has a plurality of openings through which a bolt is inserted to engage said outer link with said bed rail assemblies.

6. The roller bed rail assembly apparatus of claim 1 characterized in that said adjusting means comprise:

a bracket means connected to said support rail and to said bed rail assembly;

said bracket means is movable along the length of said support rail to adjust the position of said first and second bed rail assembly to accommodate conveyor belts of different widths.

7. The roller bed rail assembly apparatus of claim 1 characterized in that said adjusting means further comprises:

outer linkage having an upper and a lower portion;

an inner linkage comprising a slide bar and a movable member;

said slide bar extends diagonally upward from said support rail towards said upper portion of said outer linkage and is connected to said outer linkage;

said movable member slidably engages said slide bar and is movable along the length of said slide bar;

an upper surface of said movable member is coupled to a bottom surface of said bed rail assemblies; and locking/unlocking means for enabling said movable member to be fixably coupled to said slide bar or to be movable along the length of said slide bar to position said inclined rollers beneath the sides of different widths conveyor belts.

8. The roller bed rail assembly apparatus of claim 1 characterized in that said adjusting means further comprises:

outer linkage having an upper and a lower portion an inner linkage comprising a slide bar and a movable member;

said slide bar extends diagonally upward from a bracket connected to said support rail towards said upper portion of said outer linkage and is connected to said outer linkage by a bolt;

said moveable member slidably engages said slide bar and is movable along the length of said slide bar;

an upper surface of said movable member is affixed to a bottom surface of said bed rail assemblies; and locking/unlocking means for enabling said movable member to be fixably coupled to said slide bar or to be movable along the length of said slide bar to center said inclined rollers beneath the sides of different conveyor belts.

9. The roller bed rail assembly apparatus of claim 1 characterized in that said rollers urge said first and said second sides of said conveyor belt upwards to a position proximate said seals and said wear liner of said sidewalls of said hood.

10. The roller bed rail assembly apparatus of claim 1 characterized in that said rollers are mounted on said bed rail assemblies with spacing between rollers being less than 12.5% of the diameter of the rollers.

11. The roller bed rail assembly apparatus of claim 1 characterized in that said rollers are mounted on said bed rail assemblies with spacing between rollers being less than 6% of the diameter of the rollers.

12. The roller bed rail assembly apparatus of claim 1 characterized in that said rollers are smaller in diameter than said idlers by a factor of less than 1 to 3.

13. The roller bed rail assembly apparatus of claim 1 characterized in that said rollers are smaller in diameter than said idlers by a factor of less than 1 to 6.

14. The roller bed rail assembly apparatus of claim 1 characterized in that said apparatus for adjusting comprises:

adjusting means coupled to said first bed rail assembly and to said second bed rail assembly to adjust the position of said first and second bed rail assemblies along a horizontal axis to accommodate conveyor belts of different widths.

15. The roller bed rail assembly apparatus of claim 1 characterized in that said apparatus for adjusting comprises:

adjusting means coupled to said first bed rail assembly and to said second bed rail assembly to adjust the inclination said first and second bed rail assemblies.

16. The roller bed rail assembly apparatus of claim 1 characterized in that said apparatus for adjusting comprises:

adjusting means coupled to said first bed rail assembly and to said second bed rail assembly to adjust the position of said first and second bed rail assemblies along an inclined axis to center said first bed rail assembly and second bed rail assembly beneath the inclined sides of conveyor belts of different dimensions including different widths.

17. The roller bed rail assembly apparatus of claim 1 characterized in that said apparatus for adjusting comprises:

adjusting means coupled to said first bed rail assembly and to said second bed rail assembly to adjust the position of said first and second bed rail assemblies along a horizontal axis to accommodate conveyor belts of different types;

adjusting means coupled to said first bed rail assembly and to said second bed rail assembly to adjust the inclination said first and second bed rail assemblies to accommodate conveyor belts of different types; and adjusting means coupled to said first bed rail assembly and to said second bed rail assembly to adjust the position of said first and second bed rail assemblies along an inclined axis to center said first bed rail assembly and second bed rail assembly beneath the inclined sides of conveyor belts of different types.

18. Roller bed rail assembly apparatus adapted to be inserted between carry idlers of a conveyor system, said roller bed rail assembly apparatus comprising:

a support rail oriented substantially parallel to and beneath a lower surface of a conveyor belt of said conveyor system;

a first bed rail assembly coupled to a first end portion of said support rail;

an upper portion of said first bed rail assembly having a first plurality of rollers inclined at an angle offset from horizontal to said to support a first side said conveyor belt at said angle;

a second bed rail assembly coupled to an opposite end portion of said support rail;

an upper portion of said second bed rail assembly having a second plurality of rollers inclined at an angle offset from horizontal to support a second side of said conveyor belt at said angle;

apparatus for adjusting comprising adjusting means coupled to said first and said second bed rail assembly to adjust the inclination of said rollers supporting the sides of said conveyor belt; at least one idler coupled to said support rail to support a lower horizontal surface of said conveyor belt; and said apparatus for adjusting comprises adjusting a coupled to said first bed rail assembly and to said second bed rail assembly to slidably adjust the slidably position of said first and second bed rail assemblies to accommodate conveyor belts of different widths.

19. The roller bed rail assembly apparatus of claim 18 further having:

a hood covering a material receiving impact zone portion of said conveyor belt;

vertically oriented sidewalls of said hood extending downwardly towards said sides of said conveyor belt;

the lower portion of said sidewalls are each affixed to a wear liner and a seal;

said rollers urge said sides of said conveyor belt upwards to a position proximate said wear liner and against said seals to reduce conveyor belt sag to inhibit the spillage of material from the sides of said conveyor belt under said wear liners and said seals.

20. The roller bed rail assembly apparatus of claim 18 wherein said first plurality of rollers and said second plurality of rollers are mounted on said bed rail assemblies with minimal space between said rollers to reduce conveyor belt sag.

21. The roller bed rail assembly apparatus of claim 18 wherein rollers in said first plurality of rollers and said second plurality of rollers are smaller in diameter than said idlers of said conveyor system to reduce conveyor belt sag.

22. The roller bed rail assembly apparatus of claim 18 characterized in that said roller bed rail assembly apparatus is adapted to support a conveyor belt in a material receiving impact zone of said conveyor system, said roller bed rail assembly apparatus is further adapted to be inserted between said carry idlers positioned along the length of said conveyor belt to reduce conveyor belt sag, said roller bed rail assembly apparatus further includes a hood having sidewalls covering said material receiving impact zone, said sidewalls each have a wear liner and a seal affixed to a bottom portion of said sidewalls to inhibit spillage of material between the edges of said conveyor belt and said wear liners and said seals;

said roller bed rail assembly apparatus further comprising:

at least one idler coupled to said support rail beneath said conveyor belt to support a lower horizontal surface of said conveyor belt to prevent belt sag.

23. The roller bed rail assembly apparatus of claim 18 characterized in that said roller bed rail assembly apparatus is adapted to support a conveyor belt in a material receiving impact zone of a conveyor system, said roller bed rail assembly apparatus is also adapted to be inserted between said carry idlers positioned along the length of said conveyor belt to reduce conveyor belt sag, said roller bed rail assembly apparatus further includes a hood having sidewalls covering at least a portion of said material receiving impact zone of said conveyor belt, a wear liner and a seal affixed to the bottom portion of said sidewalls to inhibit spillage of material between the edges of said conveyor belt and said wear liner and said seals; and said rollers are of a diameter sufficiently smaller than the diameter of said carry idlers and are positioned sufficiently close to each other along the length of said conveyor belt at a spacing that reduces conveyor belt sag and inhibits the spillage of material between the edges of said belt and said skirting seals and said wear liners.

24. Roller bed rail assembly apparatus for supporting a conveyor belt in a material receiving impact zone of a conveyor system, said roller bed rail assembly apparatus is adapted to be inserted between carry idlers of said conveyor system along the length of said conveyor belt to reduce conveyor belt sag, said conveyor system further includes a hood having sidewalls covering at least a portion of a material receiving impact zone of said conveyor belt, a wear liner and a seal affixed to the bottom portion of said sidewalls to inhibit spillage of material between the edges of said conveyor belt and said wear liner and said seals;

said roller bed rail assembly apparatus comprising:

a support rail oriented substantially parallel to and beneath said conveyor belt;

a first bed rail assembly coupled to a first end portion of said support rail;

an upper portion of said first bed rail assembly having a plurality of rollers adjustably inclined at an angle from horizontal to said to support a first side said conveyor belt at said angle;

a second bed rail assembly coupled to an opposite end portion of said support rail;

an upper portion of said second bed rail assembly having a plurality of rollers adjustably inclined at an angle from horizontal to support a second side of said conveyor belt at said angle;

said rollers urge said first and said second sides of said belt upwards against said seals to reduce conveyor belt sag and to inhibit the spillage of material from the sides of said conveyor belt under said wear liners and said seals;

said rollers are of a diameter sufficiently smaller than the diameter of said carry idlers and are positioned sufficiently close to each other along the length of said belt at a spacing that reduces conveyor belt sag and inhibits the spillage of material between the upper edges of said belt and said seal and said wear liners.

25. The roller bed rail assembly apparatus of claim 24 characterized in that said rollers are mounted on said bed rail assemblies with spacing between rollers being less than 12.5% of the diameter of the rollers.

26. The roller bed rail assembly apparatus of claim 24 characterized in that said rollers are mounted on said bed rail assemblies with spacing between rollers being less than 6% of the diameter of the rollers.

27. The roller bed rail assembly apparatus of claim 24 characterized in that said rollers are smaller in diameter than said idlers by a factor of less than 1 to 3.

28. The roller bed rail assembly apparatus of claim 24 characterized in that said rollers are smaller in diameter than said idlers by a factor of less than 1 to 6.

29. The conveyor system of claim 24 wherein said seals are formed of rubber.

\* \* \* \* \*

UNITED STATES PATENT AND TRADEMARK OFFICE
CERTIFICATE OF CORRECTION

PATENT NO.   : 6,543,607 B2
DATED        : April 8, 2003
INVENTOR(S)  : John S. Fischer and Edgar Hugh Schwartz It is certified that error appears in the above-identified patent and that said Letters Patent is hereby corrected as shown below:

Column 12,
Line 6, replace "and the lateral spring of said first and second bed rail" with -- and the lateral spacing of said first and second bed rail --

Column 14,
Line 30, replace "said apparatus for adjusting comprises adjusting a coupled" with -- said apparatus for adjusting comprises adjusting means coupled --
Line 32, replace "rail assembly to slidably adjust the slidably position of" with -- rail assembly to slidably adjust the lateral position of --

Signed and Sealed this

Twenty-fifth Day of November, 2003

JAMES E. ROGAN
*Director of the United States Patent and Trademark Office*